United States Patent
Shroff

(10) Patent No.: US 10,516,834 B2
(45) Date of Patent: Dec. 24, 2019

(54) METHODS AND APPARATUS FOR FACILITATING SELECTIVE BLURRING OF ONE OR MORE IMAGE PORTIONS

(71) Applicant: Light Labs Inc., Redwood City, CA (US)

(72) Inventor: Sapna A. Shroff, Sunnyvale, CA (US)

(73) Assignee: Light Labs Inc., Redwood City, CA (US)

( * ) Notice: Subject to any disclaimer, the term of this patent is extended or adjusted under 35 U.S.C. 154(b) by 119 days.

(21) Appl. No.: 15/688,652

(22) Filed: Aug. 28, 2017

(65) Prior Publication Data

US 2018/0048832 A1 Feb. 15, 2018

Related U.S. Application Data

(63) Continuation of application No. 14/876,163, filed on Oct. 6, 2015, now Pat. No. 9,749,549.

(51) Int. Cl.
H04N 5/262 (2006.01)
H04N 5/225 (2006.01)
H04N 5/232 (2006.01)

(52) U.S. Cl.
CPC ......... *H04N 5/2621* (2013.01); *H04N 5/2258* (2013.01); *H04N 5/23212* (2013.01); *H04N 5/23293* (2013.01)

(58) Field of Classification Search
CPC .................................................... H04N 5/2621
See application file for complete search history.

(56) References Cited

U.S. PATENT DOCUMENTS

| 4,544,241 A | 10/1985 | LaBudde et al. |
| 8,553,106 B2 | 10/2013 | Scarff |
| 9,197,816 B2 | 11/2015 | Laroia |
| 9,270,876 B2 | 2/2016 | Laroia |
| 9,282,228 B2 | 3/2016 | Laroia |
| 9,325,906 B2 | 4/2016 | Laroia |
| 9,374,514 B2 | 6/2016 | Laroia |
| 9,423,588 B2 | 8/2016 | Laroia |
| 9,426,365 B2 | 8/2016 | Laroia et al. |
| 9,451,171 B2 | 9/2016 | Laroia |
| 9,462,170 B2 | 10/2016 | Laroia et al. |

(Continued)

FOREIGN PATENT DOCUMENTS

| WO | 2009145401 A1 | 12/2009 |
| WO | 2012089895 A1 | 7/2012 |

*Primary Examiner* — Gary C Vieaux
(74) *Attorney, Agent, or Firm* — Straub & Straub; Michael P. Straub; Stephen T. Straub

(57) ABSTRACT

Methods and apparatus provide for simulated, e.g., synthetic, aperture control. In some embodiments a user, after a camera autofocus or user selection of an object to focus on, sets a blur level and views the effect. Once the user controlled blur setting is complete, images are captured with the in-focus, e.g., autofocus, setting and other images are captured with the focus set to capture a blurred image based on the set blur level. In focus and out of focus images are captured in parallel using different camera modules in some embodiments. A composite image is generated by combining portions of one or more sharp and blurred images. Thus a user can capture portions of images with a desired level of blurriness without risking blurring other portions of an image while controlling how the captured images are combined to form a composite image with in-focus and blurred portions.

20 Claims, 11 Drawing Sheets

(56) References Cited

U.S. PATENT DOCUMENTS

| | | |
|---|---|---|
| 9,467,627 B2 | 10/2016 | Laroia |
| 9,544,501 B2 | 1/2017 | Laroia |
| 9,544,503 B2 | 1/2017 | Shroff |
| 9,547,160 B2 | 1/2017 | Laroia |
| 9,549,127 B2 | 1/2017 | Laroia |
| 9,551,854 B2 | 1/2017 | Laroia |
| 9,554,031 B2 | 1/2017 | Laroia et al. |
| 9,557,519 B2 | 1/2017 | Laroia |
| 9,557,520 B2 | 1/2017 | Laroia |
| 9,563,033 B2 | 2/2017 | Laroia |
| 9,568,713 B2 | 2/2017 | Laroia |
| 9,578,252 B2 | 2/2017 | Laroia |
| 9,671,595 B2 | 6/2017 | Laroia |
| 9,686,471 B2 | 6/2017 | Laroia et al. |
| 9,690,079 B2 | 6/2017 | Laroia |
| 9,736,365 B2 | 8/2017 | Laroia |
| 9,749,511 B2 | 8/2017 | Laroia |
| 9,749,549 B2 | 8/2017 | Shroff |
| D802,646 S | 11/2017 | Laroia et al. |
| 9,824,427 B2 | 11/2017 | Pulli et al. |
| 2004/0027695 A1 | 2/2004 | Lin |
| 2006/0187311 A1 | 8/2006 | Labaziewicz et al. |
| 2008/0247745 A1 | 10/2008 | Nilsson |
| 2010/0013906 A1 | 1/2010 | Border et al. |
| 2013/0020470 A1 | 1/2013 | Luo et al. |
| 2013/0258044 A1 | 10/2013 | Betts-Lacroix |
| 2014/0240579 A1 | 8/2014 | Park et al. |
| 2014/0267844 A1 | 9/2014 | Iwata et al. |
| 2015/0029595 A1 | 1/2015 | Swihart et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0296149 A1 | 10/2015 | Laroia |
| 2016/0004144 A1 | 1/2016 | Laroia et al. |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

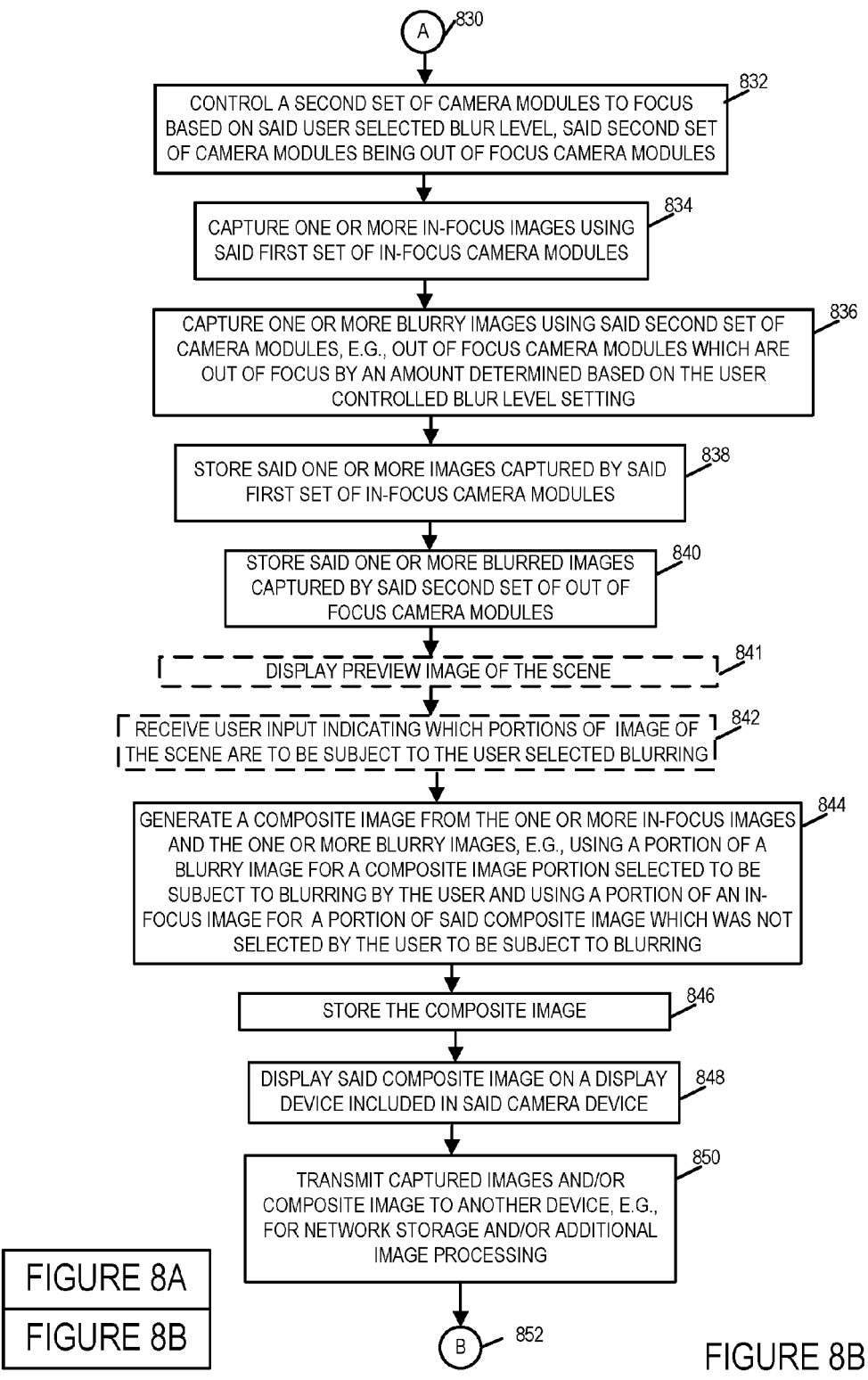

METHODS AND APPARATUS FOR FACILITATING SELECTIVE BLURRING OF ONE OR MORE IMAGE PORTIONS

RELATED APPLICATIONS

The present application is a continuation of the U.S. patent application Ser. No. 14/876,163, filed Oct. 6, 2015 the above listed patent application is hereby expressly incorporated in its entirety.

FIELD

The present application relates to methods and apparatus for capturing and controlling the capture of multiple images, e.g., some of which include a user controlled level of blurriness.

BACKGROUND

Professional photographers often used advanced techniques to control which portions of an image will be in focus while other portions of an image are intentionally out of focus.

While selective burring may be applied to portions of images as part of post processing operations, such post capture filtering to blur an image may not achieve the same effect as if the image portions subject to blurring were captured using a camera which was out of focus at a level controlled to achieve the desired level of blurring in an image.

While professional users may be familiar with advanced camera settings and be able to configure the camera by specifying a camera setting value to achieve a desired level of blurring, novice users may lack such a sense of the impact of particular settings and/or be concerned that intentionally adjusting a setting that introduces a blur effect may result in degrading or blurring portions of images which the user would like to be in focus.

In view of the above discussion, it should be appreciated that there is a need for improved methods for controlling image capture and/or using captured images where one or more of the images are captured with a level of blurriness that can be controlled by the user of the camera device.

SUMMARY

In various embodiments a user is provided the opportunity to intentionally set some portion of an image to be out of focus thereby allowing artistic control of the resulting image. While fixed aperture camera modules are used for image capture, the methods and apparatus allow for simulated, e.g., synthetic, aperture control. In some embodiments the user interface allows a user, after a camera autofocus or user selection of an object to focus on, to set a blur level and to view the effect. The user may do this by tapping on a displayed blur control icon and then adjusting a slider or dial to set a blur level to be used for capturing at least some images. The effect of the user selected level of blur is then applied to a preview image with the effect of the blur setting being shown on the screen in the preview image. Once the blur setting is complete, some images are captured with the in-focus, e.g., autofocus, setting and some images are captured with the focus set to capture a blurred image with the blur level set by the user. The capture of the sharp and blurred images may be, and in various embodiments are, in parallel, while in other embodiments the capture of the blurred image is sequential and may follow or precede the capture of the sharp in focus image. A composite image is generated by combining portions of the sharp image and the blurred image. User input may be used in selecting the sharp and blurred portions of the images or the combination may be done automatically with objects at or near the same depth as a user selected or automatically selected focus depth being taken from the sharp image and objects at other depths being taken from the blurred image. While in some embodiments a user is presented with a blur control and can see the blurring effect on the display, in other embodiments a user is presented the opportunity to enter a desired aperture setting. The effect a user would expect given an aperture setting is then simulated by controlling the focus to cause a desired amount of blurring and the compositing of the blurred image and sharp image simulates the effect of the user aperture setting. Such an interface is well suited for advanced camera users accustomed with aperture settings on cameras with adjustable apertures. Numerous additional benefits, embodiments and features are discussed in the detailed description which follows.

BRIEF DESCRIPTION OF THE FIGURES

FIG. 8 comprises FIGS. 8A and 8B.

FIG. 8B is a second part of a flow chart illustrating an exemplary method of operating a camera device in accordance with one embodiment of the present invention.

DETAILED DESCRIPTION

Figure 1:
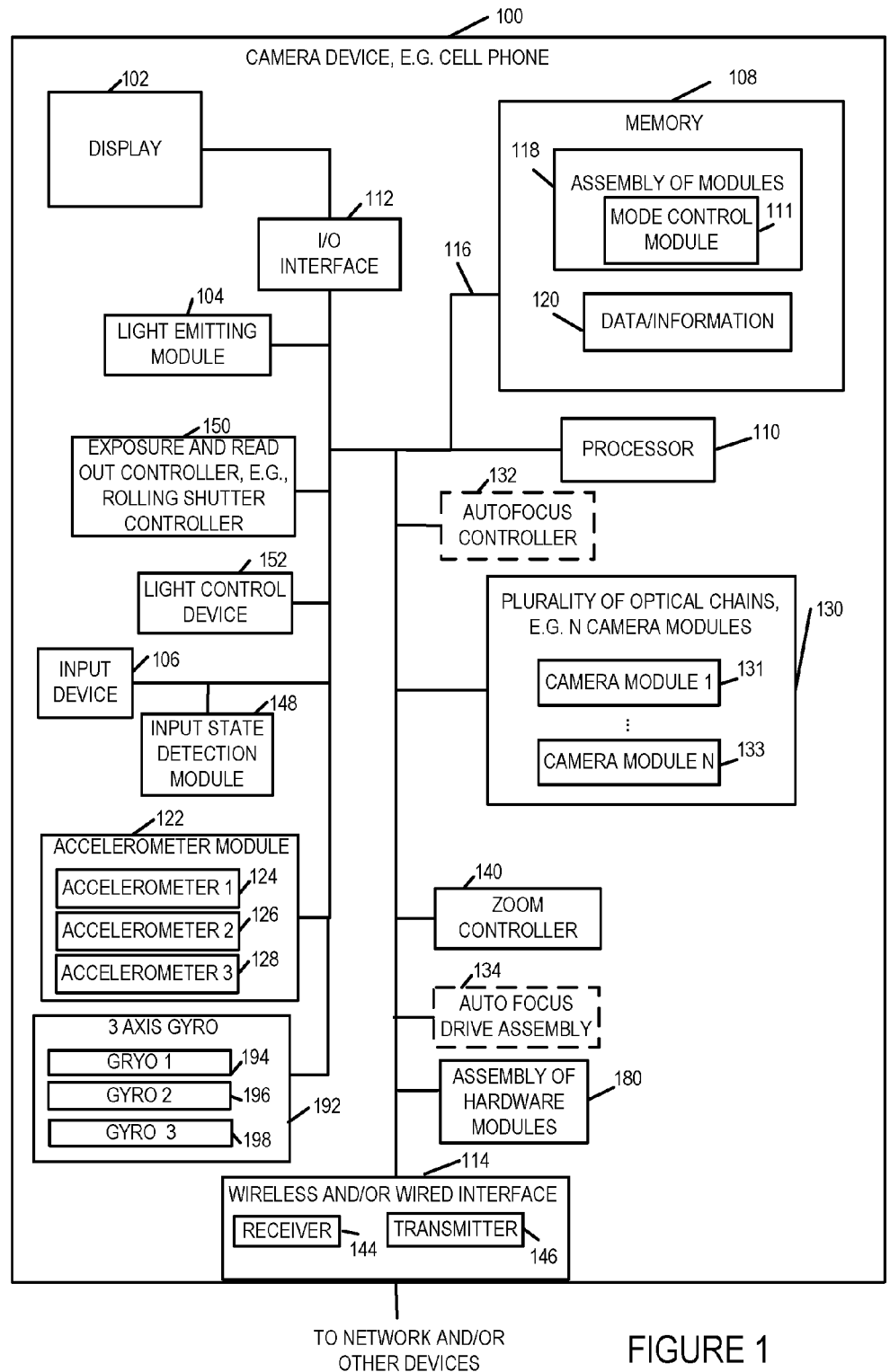
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 7A:
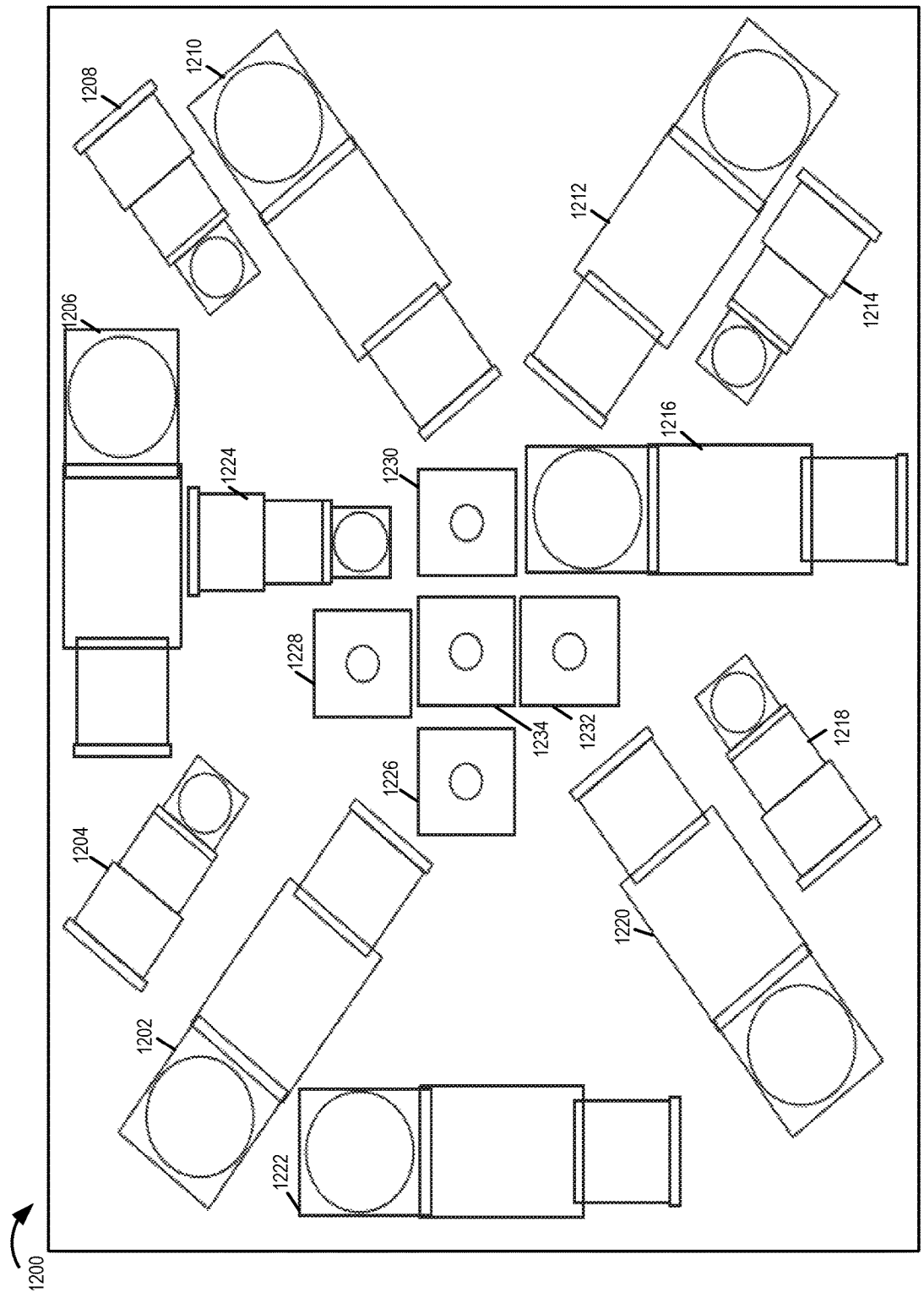
FIG. 7A illustrates an arrangement of optical chains, e.g., camera modules, used in one embodiment to implement a camera device of the type shown in FIG. 6A with the lens arrangement shown in FIG. 6B.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC =optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
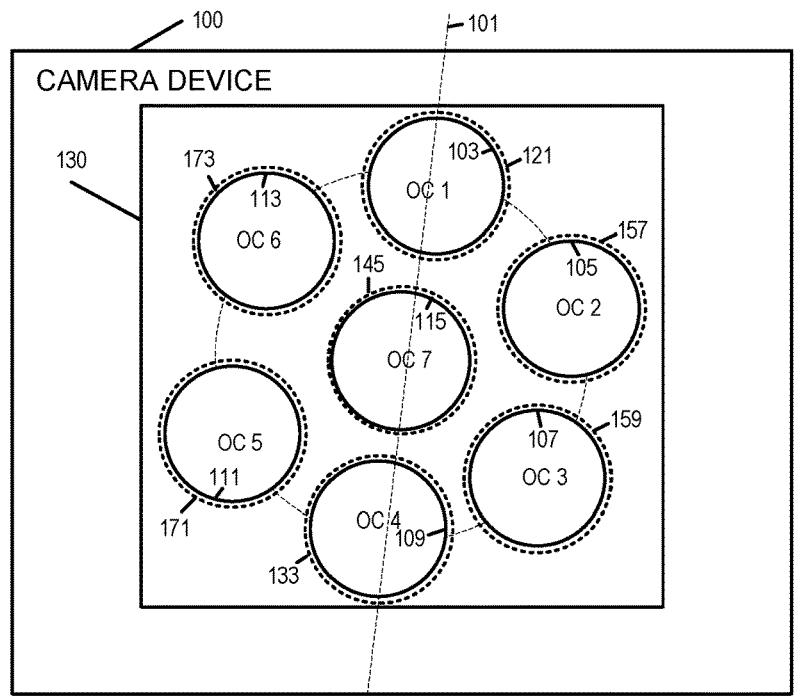
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
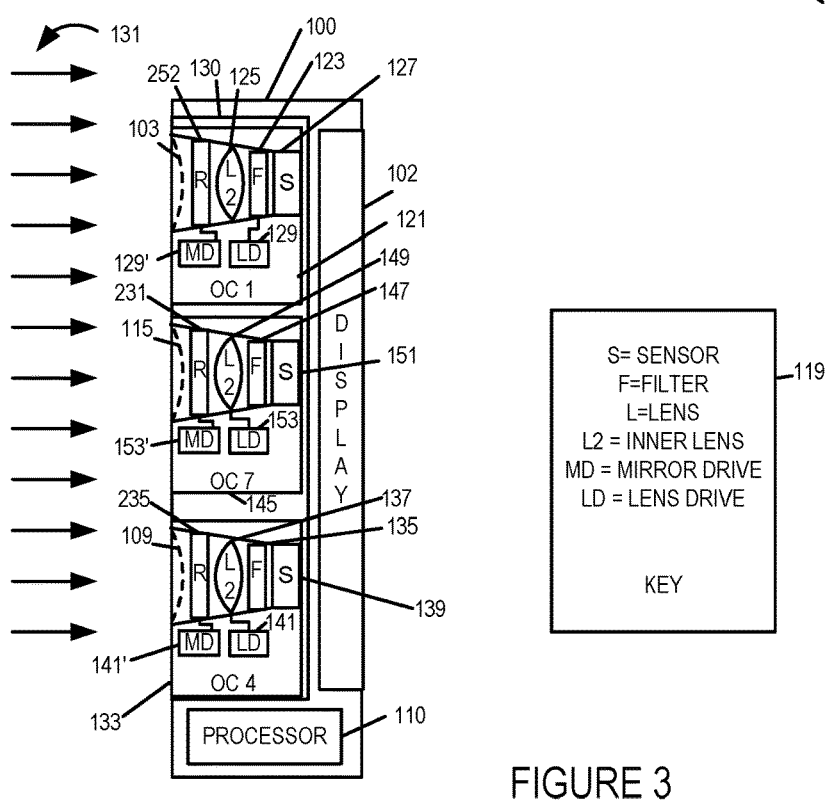
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 and FIG. 13A show optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 7B:
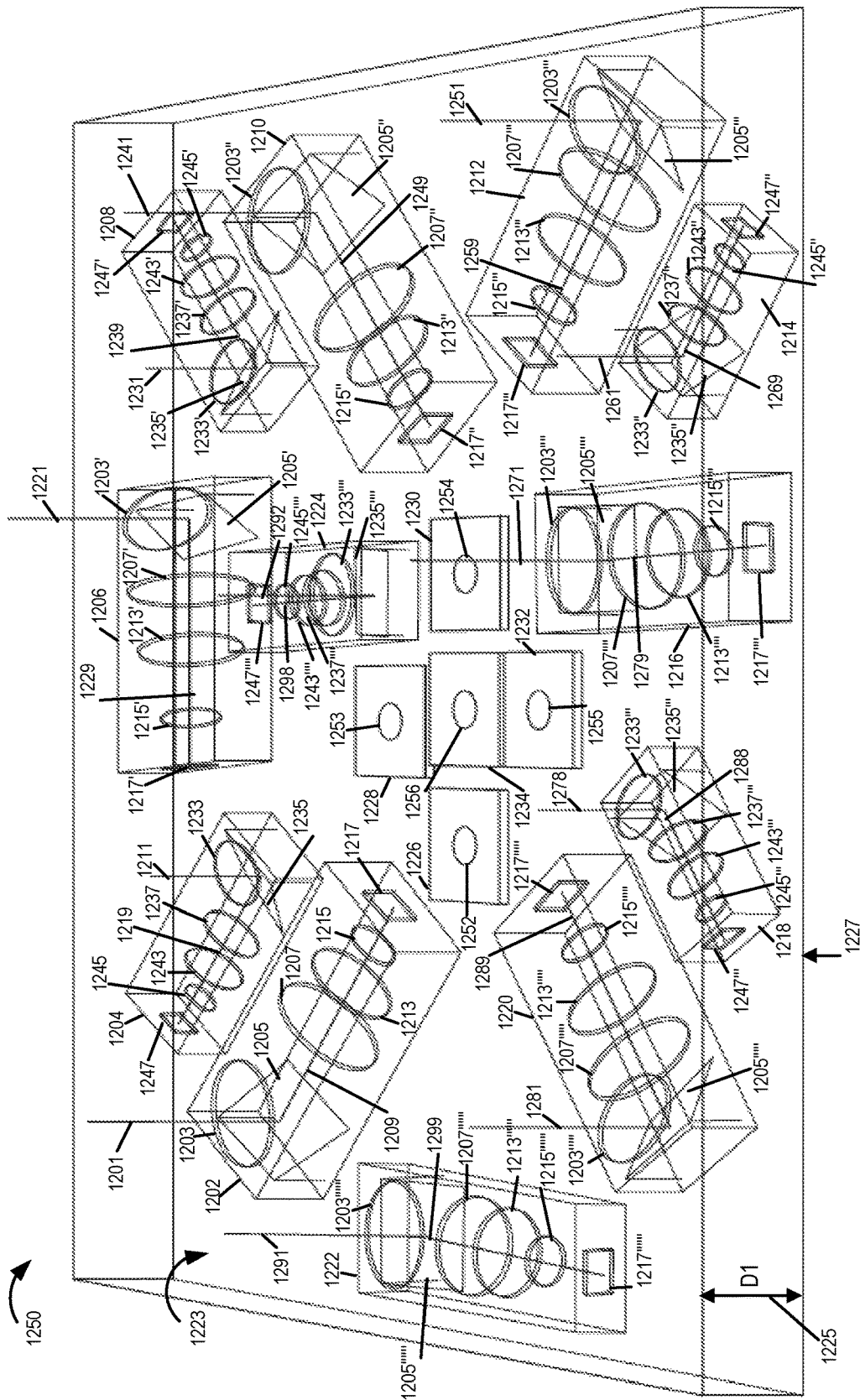
FIG. 7B illustrates a perspective view of a camera device of the type shown in FIG. 6, with the arrangement of various optical chains and elements of the optical chains in the camera device shown in greater detail.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
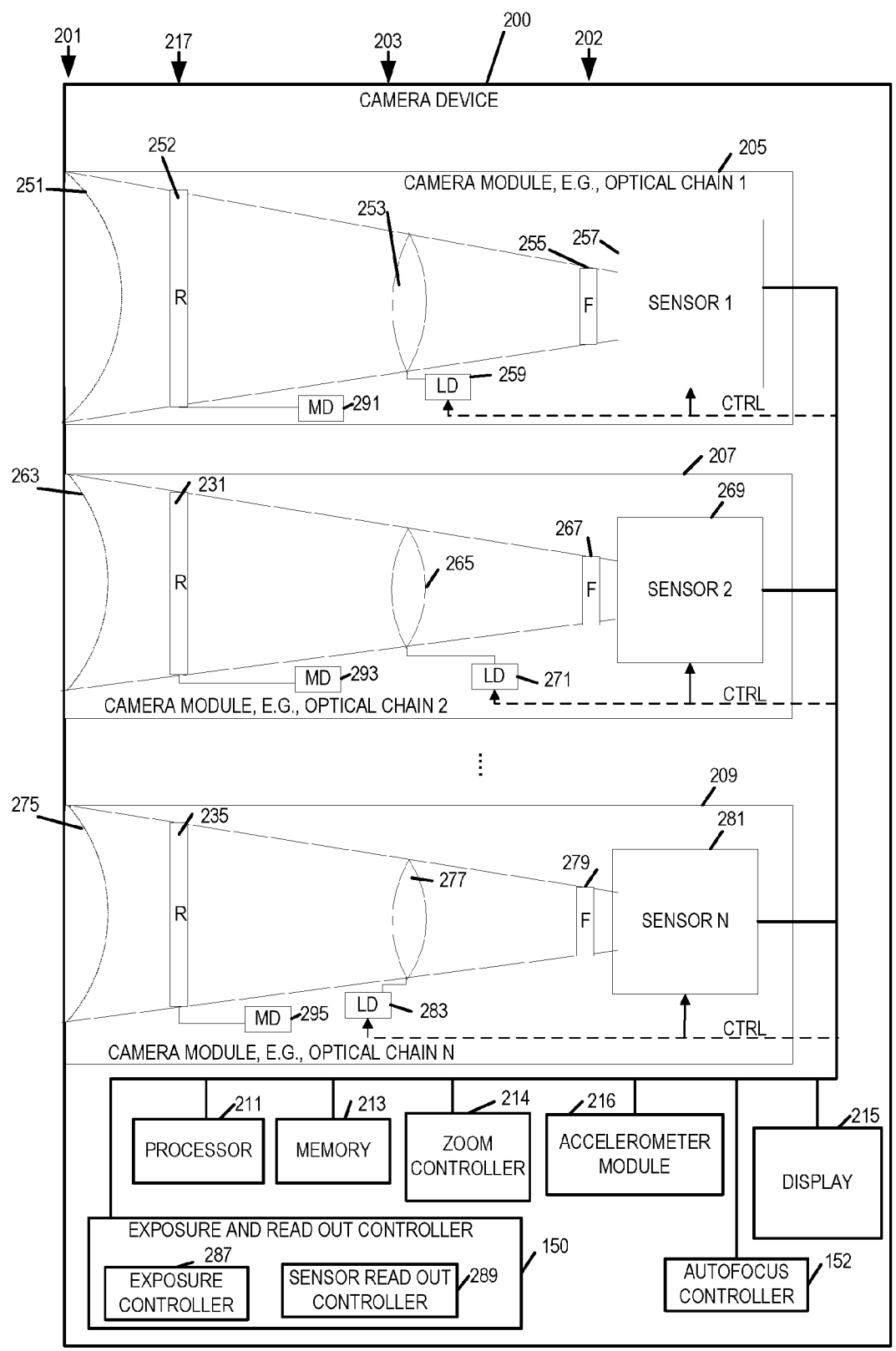
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
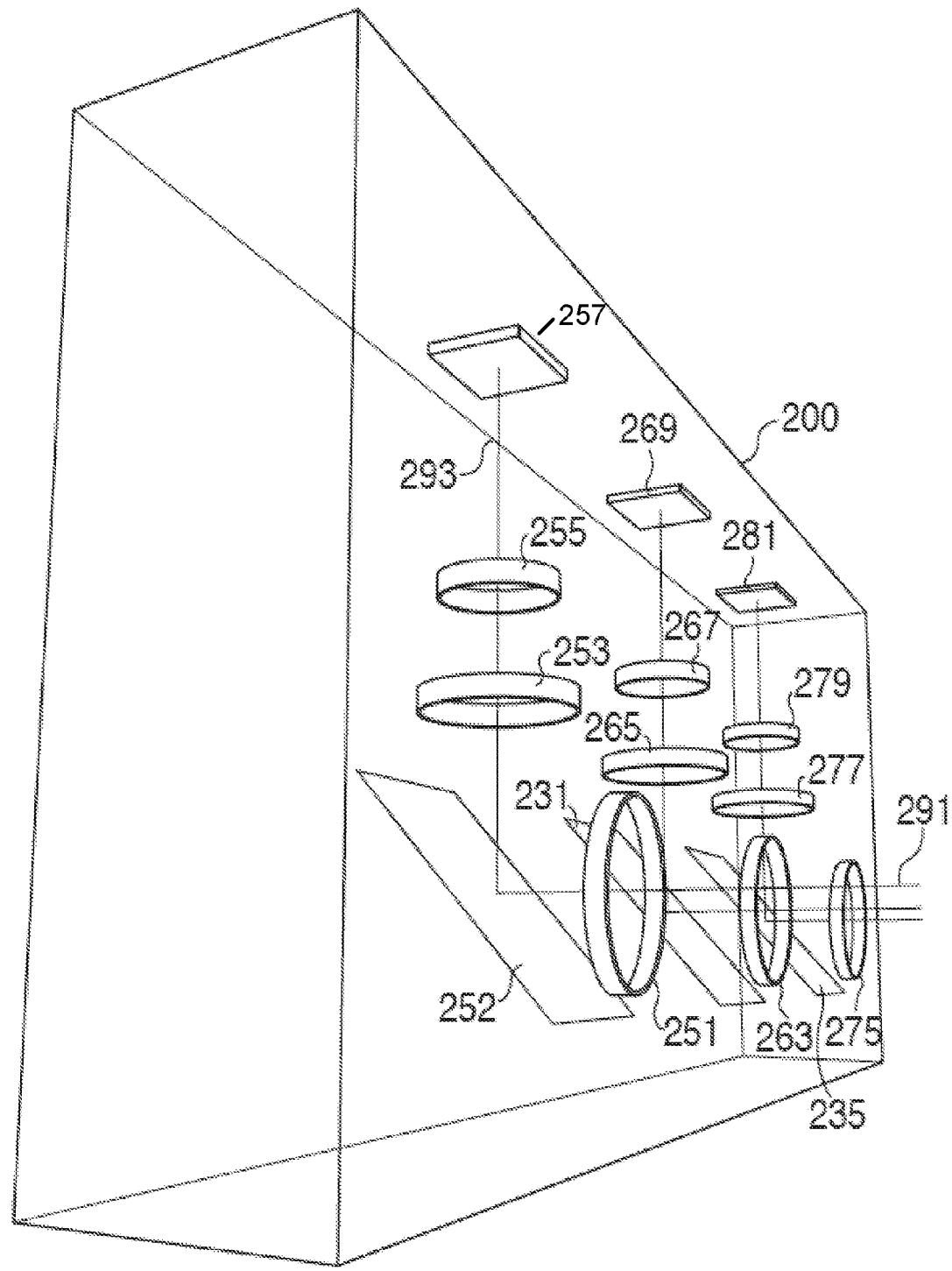
FIG. 4B illustrates the optical chains of the camera device shown in FIG. 4A, as implemented in one particular exemplary embodiment, in greater detail.
Figure 5:
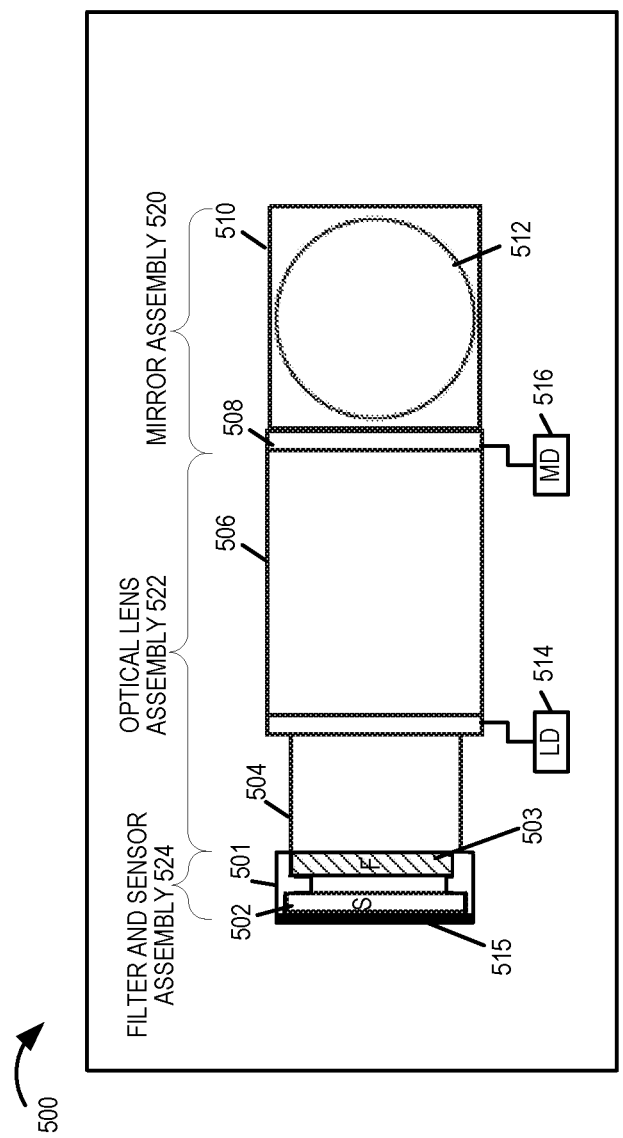
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B.

Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which maybe covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512 (which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
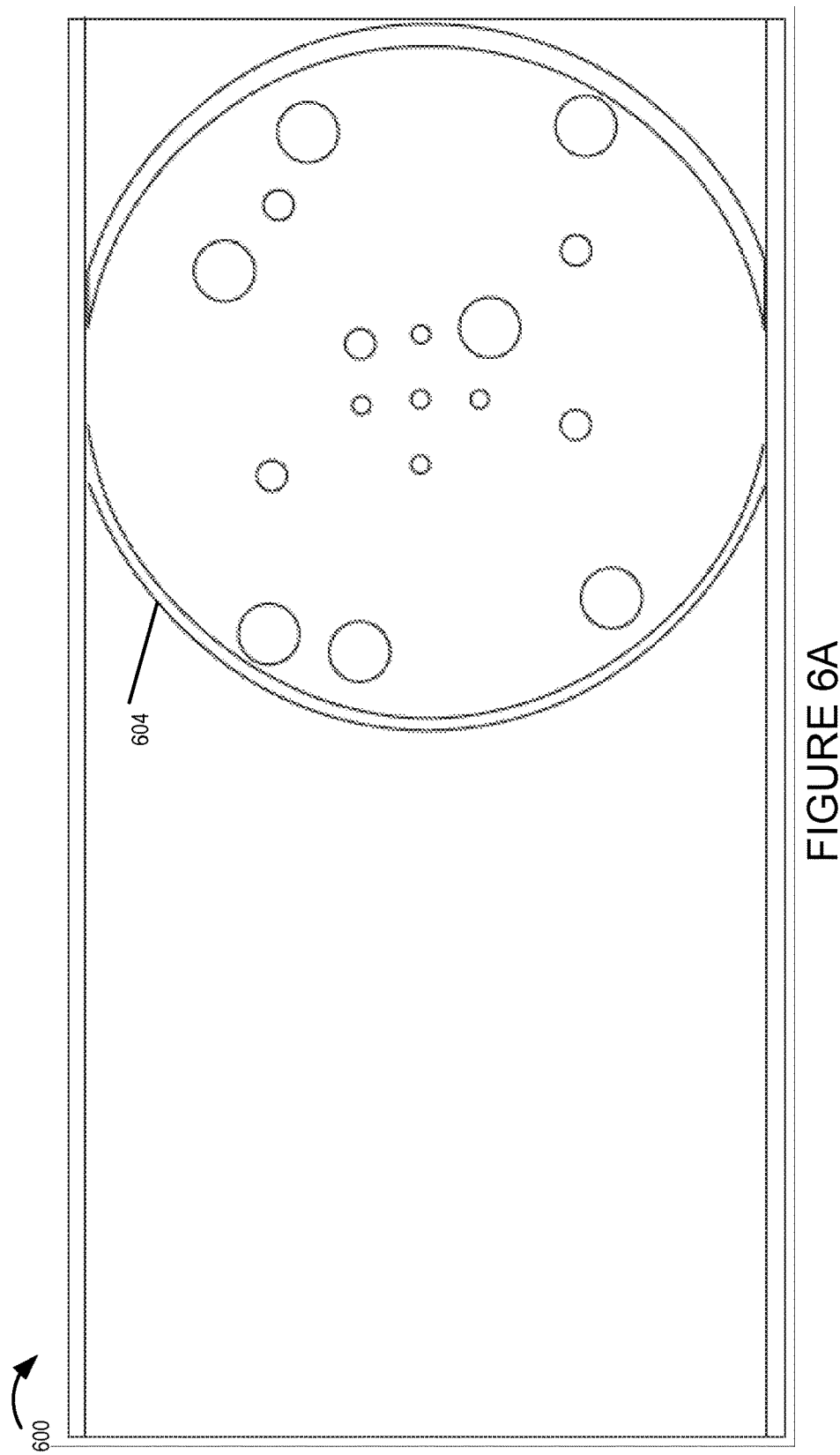
FIG. 6A is an illustration of an exemplary camera including multiple optical chains in accordance with one feature of the invention showing the arrangement of the lenses of individual camera modules

FIG. 6A is a frontal view of the camera device 600 and the optical chain arrangement of the camera device with the 15 outer openings being clearly visible as circles in the lens area 604. Note that the diameter of the smallest lenses is "d" which correspond to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
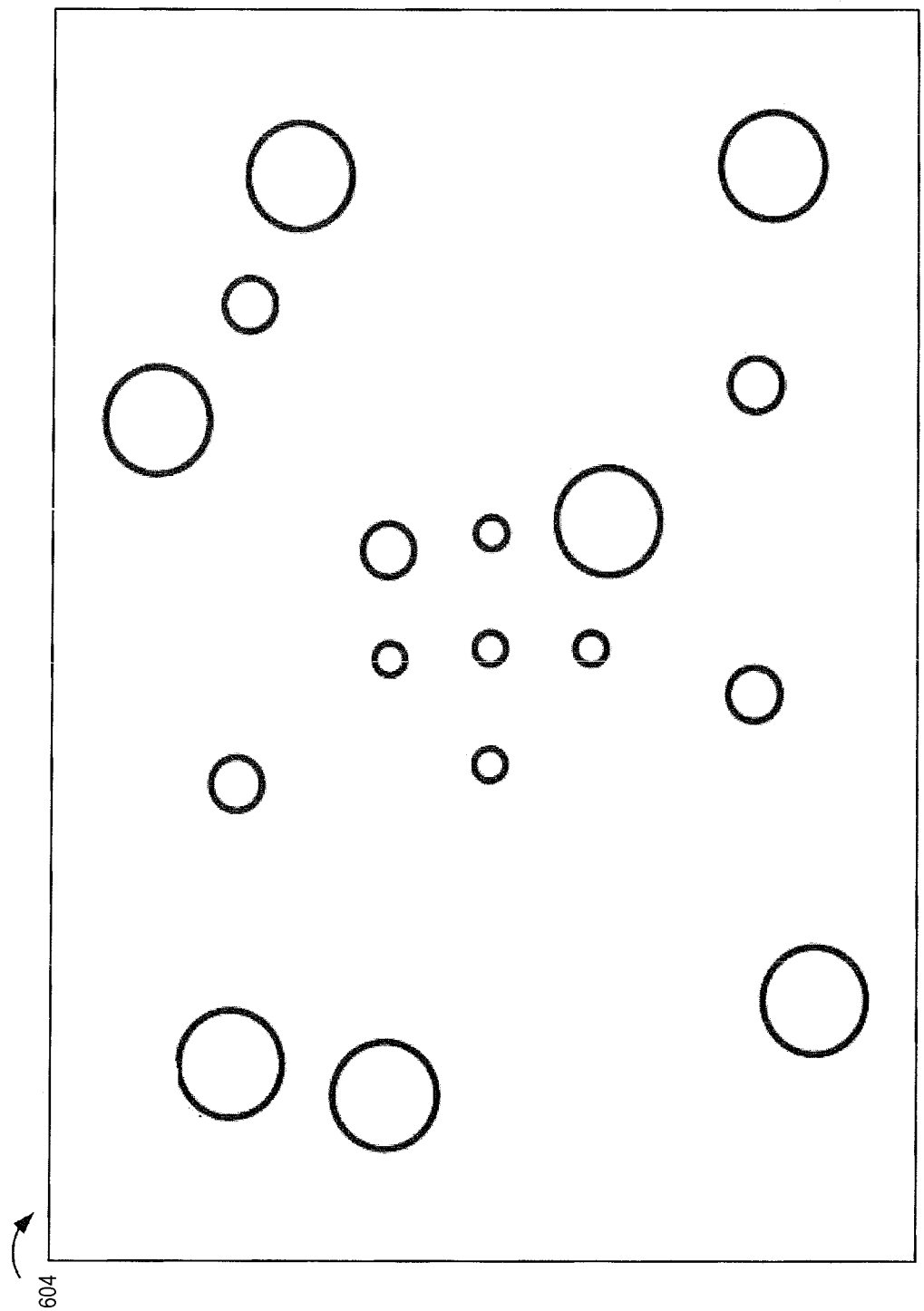
FIG. 6B illustrates the arrangement of lenses of individual optical chains in the camera device shown in FIG. 6A allowing for better appreciation of the arrangement of lenses on the front of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 maybe and in some embodiments are, used as the optical chains 1226, 1228, 1230, 1232 and 1234.

From the FIG. 7A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

FIG. 7B illustrates a perspective view 1250 of the camera device 600 showing the arrangement of various optical chains in the camera device and the elements of the optical chains in the camera device in greater detail. Thus FIG. 7B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 7A in detail.

As illustrated in FIG. 7B, the camera 600 has a depth D1 which represents the thickness of the camera 600 from the front surface of the camera (indicated by arrow 1223) to the back/rear surface of the camera (indicated by arrow 1227). While not shown in the FIG. 7B in some embodiments the camera device 600 includes the same or similar elements as the camera device of FIGS. 1 and/or 4A.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 7B each OC uses a round outer opening.

The OC 1202 includes an outer opening 1203, a light redirection device 1205, e.g., mirror, positioned behind the opening 1203, a first inner lens 1207, a second inner lens 1213, a filter 1215 and a sensor 1217. As discussed earlier in some embodiments the outer opening is covered by a flat glass plate or a flat plastic element. In some embodiments the OCs 1202, 1206, 1210, 1212, 1216, 1220, 1222 have the same focal length (largest focal length compared to other OCs in FIG. 7B) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ('") etc. For example, OC 1206 includes an outer opening 1203', a light redirection device 1205', e.g., mirror, positioned behind the opening 1203', a first inner lens 1207', a second inner lens 1213', a filter 1215', and a sensor 1217'. The OC 1210 includes an outer opening 1203", a light redirection device 1205", a first inner lens 1207", a second inner lens 1213", a filter 1215", and a sensor 1217". The OC 1212 includes an outer opening 1203''', a light redirection device 1205''', a first inner lens 1207''', a second inner lens 1213''', a filter 1215''', and a sensor 1217'''. The OC 1216 includes an outer opening 1203'''', a light redirection device 1205'''', a first inner lens 1207'''', a second inner lens 1213'''', a filter 1215'''', and a sensor 1217''''. The OC 1220 includes an outer opening 1203''''', a light redirection device 1205''''', a first inner lens 1207''''', a second inner lens 1213''''', a filter 1215''''', and a sensor 1217'''''. The OC 1222 includes an outer opening 1203'''''', a light redirection device 1205'''''', a first inner lens 1207'''''', a second inner lens 1213'''''', a filter 1215'''''', and a sensor 1217''''''.

Similarly the elements corresponding to OCs 1204, 1208, 1214, 1218, 1224 which have the same focal lengths (intermediate) have been identified using the same reference numerals. The OC 1204 includes an outer opening 1233, a light redirection device 1235, e.g., mirror, positioned behind the opening 1233, a first inner lens 1237, a second inner lens 1243, a filter 1245, and a sensor 1247. Optical chain 1208 includes an outer opening 1233', a light redirection device 1235', e.g., mirror, positioned behind the opening 1233', a first inner lens 1237', a second inner lens 1243', a filter 1245', and a sensor 1247'. OC 1214 includes an outer opening 1233", a light redirection device 1235", a first inner lens 1237", a second inner lens 1243", a filter 1245", and a sensor 1247". OC 1218 includes an outer opening 1233''', a light redirection device 1235''', a first inner lens 1237''', a second inner lens 1243''', a filter 1245''', and a sensor 1247''' and the OC 1224 includes an outer opening 1233'''', a light redirection device 1235'''', a first inner lens 1237'''', a second inner lens 1243'''', a filter 1245'''', and a sensor 1247''''.

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer opening 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost opening 1252, 1253, 1254, 1255, and 1256 respectively through which light enters, the OCs 1226, 1228, 1230, 1232 and 1234 do not have light redirection elements in the FIG. 7B example. While not shown in FIG. 7B the OCs 1226, 1228, 1230, 1232 and 1234 each has an optical axis which is perpendicular to the front face 1223 of the camera 600.

The function of the various elements of an OC such as the outer openings, inner lenses, mirror, filters and sensors, has been discussed earlier, for example in the discussion of FIGS. 4B and 5. Since the function of the elements of the OCs shown in FIG. 7B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening 1203 of the optical chain 1202 (e.g., from the front 1223 of the camera 600 as indicated by the first optical axis 1201) is redirected by mirror 1205 so that it passes through the first inner lens 1207, the second inner lens 1215 and the filter 1213 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 7B example the optical axes 1201, 1211, 1221, 1231, . . . 1298, 1299 appear to be parallel, in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8A:
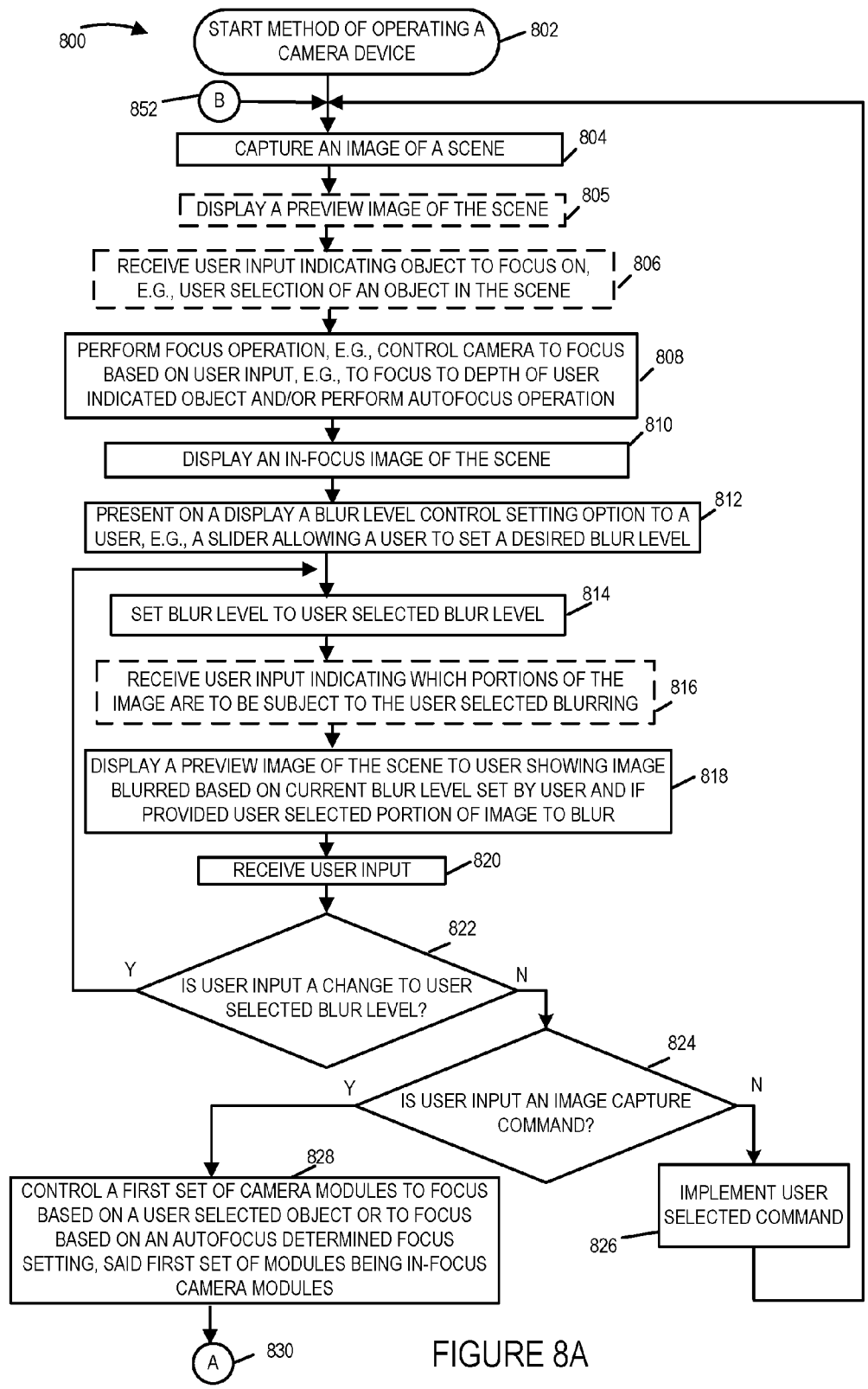
FIG. 8A is a first part of a flow chart illustrating an exemplary method of operating a camera device in accordance with one embodiment of the present invention.

FIG. 8 comprises FIGS. 8A and 8B. FIG. 8A is a first part of a flow chart illustrating an exemplary method 800 of operating a camera device in accordance with an exemplary embodiment of the present invention. FIG. 8B is a second part of a flow chart illustrating the exemplary method 800 of operating a camera device in accordance with an exemplary embodiment of the present invention. The method 800 illustrates an exemplary method of operating a camera device to selectively blur one or more portions of an image in accordance with the present invention.

The method 800 begins in start step 802 shown on FIG. 8A. Operation proceeds from step 802 to step 804. In step 804, an image of a scene is captured, e.g., by a camera module of the camera device. Operation proceeds from step 804 to optional step 805. In step 805, a preview image of the scene is displayed, for example on a display device such as a screen of the camera device. Operation proceeds from optional step 805 to optional step 806. In step 806, user input is received indicating an object to focus on, e.g., a user selection of an object in the scene. Operation proceeds from optional step 806 to step 808.

In step 808, a focus operation is performed. For example, the camera device may be, and in some embodiments is, controlled to perform a focus operation based on the received user input such as for example to focus to a depth of the user indicated object. In some embodiments, the camera device performs an autofocus operation. Operation proceeds from step 808 to step 810.

In step 810, an in-focus image of the scene is displayed for example on a display device included in the camera device. Operation proceeds from step 810 to step 812.

In step 812, a user of the camera device is presented on a display with a blur level control setting option, e.g., a slider displayed allowing a user to set a desired blur level. In some embodiments, the slider is displayed on a touch screen and the user can move an indicator on the screen such as a pointer or arrow on the slider to show and select the amount of the desired blur level. In some embodiments, the blur level is also indicated via a number such as for example a number from 1 to 100 shown on the display as the indicator of the slider is moved from left to right on the display. In some embodiments, the desired level of blur may be input by the user typing in a number indicating the blur level. The number may be, and in some embodiments is, entered via a keypad included with the camera device. The number may also be entered via a touch screen display entry. In some embodiments, the user may set the blur control level by tapping on a displayed blur control icon and then adjusting a slider or dial to set a blur level to be used for capturing at least some images. In some embodiments, blur control level settings are input by the user prior to capture of an image of a scene. Operation proceeds from step 812 to step 814. In step 814, the blur level is set to the user selected and/or inputted blur level. Operation proceeds from step 814 to optional step 816.

In step 816 which is optional user input is received which indicates which portions of the image are to be subject to the user selected blurring. Operation proceeds from step 816 to step 818. In step 818, a preview image is displayed to the user, for example on a display device such as a screen of the camera device. The preview image shows the image of the scene blurred based on the current blur level set by the user and optionally, if provided, the user selected portions of the image to blur. In some embodiments, the preview image is generated by simulating a blur corresponding to the user selected blur level. In some embodiments, the preview image is an image captured by a camera module which is set to an out of focus level determined based on the user selected blur level. Operation proceeds from step 818 to step 820.

In step 820, another user input is received. Operation proceeds from step 820 to decision step 822. In decision step 822, a determination is made. If the user input received in step 820 is a change to the user selected blur level then operation proceeds to step 814 in which the blur level is set to the user selected blur level. If the user input received in step 820 is determined in step 822 to not be a user input to change the user selected blur level operation proceeds to decision step 824.

In decision step 824, a determination is made. If the user input received in step 820 is not an image capture command then operation proceeds to step 826. In step 826, the user selected or inputted command received in step 820 is implemented and operation proceeds from step 826 to step 804 where an image of a scene is captured. Operation then proceeds in accordance with the steps of the method 800.

Returning to decision step 824, if it is determined that the user input received in step 824 is not an image capture command then operation proceeds from step 824 to step 828.

In step 828, a first set of camera modules is controlled to focus based on a user selected object or to focus based on an autofocus determined focus setting. The first set of camera modules being in-focus camera modules. Operation proceeds from step 828 via connection node A 830 to step 832 shown on FIG. 8B.

In step 832, a second set of camera modules is controlled to focus based on the user selected blur level. The second set of camera modules being out of focus camera modules. Operation proceeds from steps 832 to step 834. In step 834, the one or more in-focus images are captured using the first set of in-focus camera modules. Operation proceeds from step 834 to step 836. In step 836, one or more blurry images are captured using the second set of camera modules, e.g., the out of focus camera modules which are out of focus by an amount determined based on the user controlled blur level setting. Operation proceeds from step 836 to step 838.

In step 838, the one or more images captured by the first set of camera modules, the in-focus camera modules, are stored for example in a storage device such as the memory of the camera device. Operation proceeds from step 838 to step 840. In step 840, the one or more blurred images captured by the second set of camera modules, the out of focus camera modules, are stored for example in a storage device such as the memory of the camera device. Operation proceeds from step 840 to optional step 841.

In optional step 841 a preview image of the scene is displayed to the user for example on a display device such as a touch screen device included in the camera device. Operation proceeds from optional step 841 to step 842. In optional step 842, a user input is received indicating which portions of the image of the scene are to be subjected to the user selected blurring. Operation proceeds from optional step 842 to step 844.

In step 844, a composite image is generated from the one or more in-focus images and the one or more blurry images, e.g., by including a portion of a blurry image for a composite image portion selected to be subject to blurring by the user and using a portion of an in-focus image for a portion of the composite image which was not selected by the user to be subject to blurring. Generation of the composite image, may and in most but not all embodiments, includes combining images which are in-focus and images which are not in focus to form the composite image. Operation then proceeds from step 844 to step 846. In step 846, the composite image is stored for example in a storage device such as the memory of the camera device. Operation proceeds from step 846 to step 848. In step 848 the composite image is displayed on a display device included in the camera device such as for example a touch screen. Operation proceeds from step 848 to step 850. In step 850, the captured images and/or composite image is transmitted to another device, e.g., for network storage and/or additional image processing. In some embodiments, whether the composite image and/or the captured images are outputted is determined based on one or more user inputs. For example, the user may be prompted as to whether the composite image and/or the captured images are to be displayed, stored for future reference and/or processing and/or transmitted to another device. Operation proceeds from step 850 via connection node B 852 to step 804 shown on FIG. 8A in which an image of a scene is captured. Operation then proceeds as previously described as the steps of method 800 are performed by the camera device.

In some embodiments, the preview image displayed in step 818 and/or 842 is an image captured by a camera module which is set to an out of focus level determined based on the user selected blur level or a preview image generated by simulating a blur corresponding to the user selected blur level.

In most but not all embodiments, the focus of the in-focus camera modules of the first set of camera modules is not based on the user selected blur level.

In some embodiments, the step of capturing the one or more blurry images includes operating the second set of camera modules in parallel with the first set of camera modules to capture the images at the same time.

In some embodiments, the step of generating a composite image includes using a portion of a blurry image for a composite image portion selected to be subject to blurring by the user and using a portion of an in-focus image for a portion of the composite image which was not selected by the user to be subject to blurring.

In some embodiments, the user selects different portions of a scene, e.g., via touch screen input, and indicates and/or selects a different desired blur level setting for one or more of the different individual portions selected. In some such embodiments, out of focus camera modules are set to focus at different depths based on the user selected level of blurring for each of the different portions to capture one or more images with different amounts of blur introduced for the different selected portions. The focus distance for the out of focus camera modules is intentionally different than the focus distance setting used for the in-focus camera module. In some of such embodiments, the different portions of the scene are selected by tapping a touch screen displaying a preview image of the scene. In some embodiments, the different portions of the scene are selected by identifying the portions via touch inputs on a touch screen. The effect of the blurring of the different selected portions of the image of the scene are sometimes displayed on a display device of the camera device such as the touch screen. In some of such embodiments, the user can re-select one or more of the different portions of the image of the scene and modify the blur level setting for that portion of the scene. In some of such embodiments, another preview image will be displayed showing the effect of the blur level setting modification to the image of the scene. In some embodiments, the preview images showing the effect of the blur level setting on the different portions of the image of the scene are generated by the camera device via a simulation. In some embodiments, the preview images of the scene is generated by capturing one or more images of the scene using one or more out of focus camera modules and one or more in focus camera modules. In some embodiments, the preview image is generated by combining one or more out of focus captured images and one or more in-focus captured images to generate a composite image of the scene. Upon being presented with the preview image of the scene on the display, a menu of options may and in some embodiments is also displayed on the camera device's display allowing the user to chose from one or more options of outputting the displayed image, saving to memory the displayed image, printing the displayed image, and/or transmitting the displayed image and the one or more images from which it was created to another device such as for example additional processing and/or storage.

The method 800 may, and in some embodiments, is implemented using one of the exemplary camera devices and optical chains or modules illustrated in FIGS. 1, 2, 3, 4A, 4B, 5, 6A, 6B, 7A or 7B.

Another embodiment of the present invention includes an apparatus such as for example a camera device including a camera module configured to capture an image of a scene; an input device for receiving a blur level selection setting; and a display device configured to display a preview image of the scene showing an effect of the inputted blur level setting selection. In some embodiments, the input device is sensor circuitry included in said display device. In some embodiments, the camera device includes a touch screen which includes the input device and the display device. In some embodiments, the camera device also includes a processor configured to control the camera device to: present on the display a blur control setting to a user; and generate the preview image of the scene from the image of the scene captured by the camera module by simulating a blur corresponding to the user selected blur level or by setting an out of focus level of the camera module, the out of focus level determined based on the blur level selection setting.

In some embodiments, the camera device also includes a first set of camera modules; a second set of camera modules; and a processor configured to control the first set of camera modules to focus based on a user selected object or to focus based on an autofocus determined focus setting, said first set of camera modules being in-focus camera modules. In some of such embodiments, the focus of the in-focus camera modules is not based on the user selected blur level, and the processor is further configured to control the second set of camera modules to focus based on the selected blur level, the second set of camera modules being out of focus camera modules.

In some embodiments, the processor is further configured to control said camera device to: capture one or more in-focus images using said first set of camera modules; and capture one or more blurry images using said second set of camera modules.

In some embodiments, the processor of the camera device is further configured to control the camera device to operate the second set of camera modules in parallel with the first set of camera modules to capture images at the same time.

In some embodiments the processor of the camera device is further configured to control the camera device to generate a composite image from the one or more in-focus captured images and the one or more captured blurry or out of focus images.

In some embodiments, the processor is further configured to control the camera device to receive user input indicating which portions of an image are to be subject to the user selected blurring.

In some embodiments, the processor is further configured to control the camera device to generate a composite image using a portion of a blurry image for a composite image portion selected to be subject to blurring by the user and using a portion of an in-focus image for a portion of said composite image which was not selected by the user to be subject to blurring.

Another exemplary embodiment of the present invention includes a non-transitory computer readable medium including computer executable instructions which when executed by a processor control a camera device to: capture an image of a scene; set a blur level to a user selected blur level; and display a preview image of the scene showing an effect of the user selected blur level.

The camera devices of the present invention support multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In some embodiments, one or more steps of the disclosed methods may be implemented on one or more processors or dedicated hardware circuitry. In some embodiments, each step of the disclosed method may be implemented as a hardware module, e.g., a module including circuitry, a software module or a module including both hardware and software.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablets, smart phones and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of operating a camera device, the method comprising:
controlling a first set of camera modules to focus based on first user input in the form of user selection of an object or to focus based on an autofocus determined focus setting, said first set of camera modules being in-focus camera modules, wherein the focus of the in-focus camera modules is not based on a user selected blur level; and
controlling a second set of camera modules to focus based on second user input, said second user input being different from said first user input.

2. The method of claim 1, further comprising:
capturing one or more in-focus images using said first set of camera modules; and
capturing one or more blurry images using said second set of camera modules.

3. The method of claim 2,
wherein the second user input is a user selected blur level; and
wherein the second set of camera modules are out of focus camera modules which are controlled to have a focus which is out of focus with respect to the user selected object or the autofocus determined focus setting.

4. The method of claim 2, wherein capturing one or more blurry images includes operating said second set of camera modules in parallel with said first set of camera modules to capture images at the same time.

5. The method of claim 4, further comprising:
generating a composite image from one or more in-focus images and said one or more blurry images.

6. The method of claim 5, further comprising:
receiving user input indicating which portions of an image are to be subject to user selected blurring.

7. The method of claim 6, wherein generating a composite image includes using a portion of a blurry image for a composite image portion selected to be subject to blurring by the user and using a portion of an in-focus image for a portion of said composite image which was not selected by the user to be subject to blurring.

8. The method of claim 7, further comprising:
displaying said composite image on a display device.

9. The method of claim 1, wherein the first set of camera modules includes a plurality of camera modules and wherein the second set of camera modules also includes a plurality of camera modules.

10. The method of claim 3, wherein a focus distance setting for the out of focus camera modules is intentionally different than a focus distance setting used for the in-focus camera modules.

11. The method of claim 1,
wherein the second set of camera modules are out of focus camera modules and wherein the method further comprises:

controlling different out of focus camera modules to focus at different depths based on different user selected blur levels to be applied to different user selected portions of the scene.

12. A camera device comprising:
a first set of camera modules;
a second set of camera modules;
an input device for receiving using input; and
a processor configured to:
control a first set of camera modules to focus based on first user input in the form of user selection of an object or to focus based on an autofocus determined focus setting, said first set of camera modules being in-focus camera modules, wherein the focus of the in-focus camera modules is not based on a user selected blur level; and
control a second set of camera modules to focus based on second user input, said second user input being different from said first user input.

13. The camera device of claim 12, wherein said processor is further configured to control said camera device to:
capture one or more in-focus images using said first set of camera modules; and
capture one or more blurry images using said second set of camera modules.

14. The camera device of claim 13,
wherein the second user input is a user selected blur level; and
wherein the second set of camera modules are out of focus camera modules which are controlled to have a focus which is out of focus with respect to the user selected object or the autofocus determined focus setting.

15. The camera device of claim 13, wherein said processor is further configured to control said camera device to operate said second set of camera modules in parallel with said first set of camera modules to capture images at the same time.

16. The camera device of claim 15, wherein said processor is further configured to control said camera device to generate a composite image from said one or more in-focus images and said one or more blurry images.

17. The camera device of claim 15, wherein said processor is further configured to control said camera device to receive user input indicating which portions of an image are to be subject to user selected blurring.

18. The camera device of claim 17, wherein said processor is further configured to control said camera device to generate a composite image using a portion of a blurry image for a composite image portion selected to be subject to blurring by the user and using a portion of an in-focus image for a portion of said composite image which was not selected by the user to be subject to blurring.

19. The camera device of claim 12, wherein the processor is further configured, as part of controlling the second set of camera modules to focus to:
control different camera modules in said second set of camera modules to focus at different depths based on different user selected blur levels.

20. A non-transitory computer readable medium including computer executable instructions which when executed by a processor control a camera device to:
control a first set of camera modules to focus based on first user input in the form of user selection of an object or to focus based on an autofocus determined focus setting, said first set of camera modules being in-focus camera modules, wherein the focus of the in-focus camera modules is not based on a user selected blur level; and control a second set of camera modules to focus based on second user input, said second user input being different from said first user input.

\* \* \* \* \*